(12) United States Patent
Bacic et al.

(10) Patent No.: US 12,252,266 B2
(45) Date of Patent: Mar. 18, 2025

(54) AIRCRAFT ENGINE FUEL SYSTEM

(71) Applicant: ROLLS-ROYCE plc, London (GB)

(72) Inventors: Marko Bacic, Oxford (GB); John Coull, Cambridge (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/483,106

(22) Filed: Oct. 9, 2023

(65) Prior Publication Data

US 2024/0132227 A1 Apr. 25, 2024
US 2024/0228055 A9 Jul. 11, 2024

(30) Foreign Application Priority Data

Oct. 24, 2022 (GB) .................... 2215720

(51) Int. Cl.
| | |
|---|---|
| B64D 37/30 | (2006.01) |
| B64D 37/34 | (2006.01) |
| F02C 3/22 | (2006.01) |
| F02C 7/14 | (2006.01) |
| F02C 7/22 | (2006.01) |
| F02C 7/224 | (2006.01) |
| F02C 9/40 | (2006.01) |

(52) U.S. Cl.
CPC ............. *B64D 37/30* (2013.01); *B64D 37/34* (2013.01); *F02C 3/22* (2013.01); *F02C 7/14* (2013.01); *F02C 7/22* (2013.01); *F02C 7/224* (2013.01); *F02C 9/40* (2013.01)

(58) Field of Classification Search
CPC . B64D 37/30; B64D 37/34; F02C 3/22; F02C 7/14; F02C 7/224; F02C 9/40
See application file for complete search history.

(56) References Cited

U.S. PATENT DOCUMENTS

| | | | | |
|---|---|---|---|---|
| 4,178,761 | A | * 12/1979 | Schwartzman | .......... F01K 25/10 60/671 |
| 2015/0128597 | A1 | * 5/2015 | Schlak | ....................... F02C 3/08 60/719 |
| 2015/0251766 | A1 | * 9/2015 | Atkey | ..................... F25B 27/00 60/785 |

(Continued)

FOREIGN PATENT DOCUMENTS

| | | |
|---|---|---|
| EP | 3978738 A1 | 4/2022 |
| EP | 3995679 A1 | 5/2022 |

(Continued)

OTHER PUBLICATIONS

Great Britain search report dated Mar. 31, 2023, issued in GB Patent Application No. 2215720.0.

(Continued)

*Primary Examiner* — Kyle Robert Thomas

(57) ABSTRACT

An aircraft propulsion system fuel system comprises a fuel line configured to receive liquid hydrogen fuel from a fuel tank, a vaporizer configured to vaporize liquid hydrogen fuel from the fuel line to generate a supercritical or gaseous fuel, a main fuel pump configured to receive and to pump the gaseous or supercritical fuel from the vaporizer during operation of the propulsion system, and a heater provided downstream in fuel flow to the main fuel pump, and configured to raise the temperature of the gaseous or supercritical fuel to a propulsion system delivery temperature.

16 Claims, 12 Drawing Sheets

(56) References Cited

U.S. PATENT DOCUMENTS

| | | | | |
|---|---|---|---|---|
| 2015/0330869 A1* | 11/2015 | Ziarno | ................. | G01M 15/14 |
| | | | | 701/34.4 |
| 2016/0076461 A1* | 3/2016 | Kawai | .................... | B64D 37/30 |
| | | | | 60/39.463 |
| 2016/0123226 A1* | 5/2016 | Razak | ....................... | F02C 7/18 |
| | | | | 60/39.15 |
| 2021/0151783 A1* | 5/2021 | Miftakhov | ........ | H01M 8/04738 |
| 2022/0145801 A1* | 5/2022 | McCurdy Gibson | ..... | F02C 3/22 |
| 2022/0178307 A1* | 6/2022 | Palmer | .................... | F02C 7/143 |

FOREIGN PATENT DOCUMENTS

| | | | |
|---|---|---|---|
| EP | 4144970 A2 | 3/2023 | |
| GB | 2240813 A | 8/1991 | |
| WO | 2012173651 A1 | 12/2012 | |

OTHER PUBLICATIONS

European search report dated Feb. 23, 2024, issued in EP 23199303.1.

* cited by examiner

AIRCRAFT ENGINE FUEL SYSTEM

CROSS-REFERENCE TO RELATED APPLICATIONS

This specification is based upon and claims the benefit of priority from United Kingdom patent application number GB 2215720.0 filed on Oct. 24, 2022, the entire contents of which is incorporated herein by reference.

BACKGROUND

Technical Field

This disclosure relates to fuel systems for hydrogen-fuelled aero engines, such as fuel-cell powered or gas turbine engine powered propulsion systems.

Description of the Related Art

In order to limit emissions of carbon dioxide, use of hydrogen as an alternative to hydrocarbon fuel in gas turbine engines has historically only been practical in land-based installations. However, liquid hydrogen fuelled airliners have recently been proposed. Similarly, hydrogen fuel cell powered propulsion systems have also been proposed. The liquid for fuel such aircraft however must be heated prior to combustion in the gas turbine engine, or provision to the hydrogen fuel cell. Doing so in a manner which is efficient from an overall propulsion system perspective is a significant challenge.

SUMMARY

The disclosure is directed towards an aircraft propulsion system fuel system comprising a hydrogen fuel vaporiser for vaporising cryogenically-stored hydrogen fuel prior to injection into gas turbine engines, propulsion systems such as hydrogen fuel cell and gas turbine engine powered propulsion systems, and methods of operating such gas turbines.

In a first aspect, one such aircraft propulsion system fuel system comprises:
- a fuel line configured to receive liquid hydrogen fuel from a fuel tank;
- a vaporizer configured to vaporize liquid hydrogen fuel from the fuel line to generate a supercritical or gaseous fuel;
- a main fuel pump configured to receive and to pump the gaseous or supercritical fuel from the vaporizer during operation of the propulsion system; and
- a heater provided downstream in fuel flow to the main fuel pump, and configured to raise the temperature of the gaseous or supercritical fuel to a propulsion system delivery temperature.

Advantageously, fuel is pumped in a gaseous or supercritical state rather than in a liquid state, which may alleviate various technical hurdles of liquid hydrogen pumping. However, the temperature of the liquid hydrogen gas during pumping is minimized, to thereby minimize the volume of fuel flow that must be delivered to the pump, and also reduce the pumping work required.

The propulsion system may comprise a gas turbine engine, and the fuel system delivery temperature may comprise an injector delivery temperature. Alternatively, the propulsion system may comprise a hydrogen fuel cell configured to provided electrical power to drive an electrically driven propulsor, and the propulsion system delivery temperature may comprise a fuel cell delivery temperature.

The fuel system may comprise a low-pressure fuel pump provided upstream of the vaporizer and the main fuel pump, and configured to pump liquid hydrogen. Advantageously, fuel is provided to the vaporizer by the low-pressure pump.

The fuel system may comprise a boost pump provided between the low-pressure fuel pump and the main fuel pump. The low-pressure and/or booster pressure pump may be configured to pump liquid hydrogen at an inlet, and provide supercritical hydrogen at an outlet for pumping by the main fuel-pump. Advantageously, relatively small pressure rise can be provided by the low-pressure and booster pumps to convert the liquid hydrogen to a supercritical state for further processing, with the majority of the pumping work being carried out at a low temperature supercritical state.

Such an arrangement may reduce pumping work, and thereby reduce the size and power requirements of the main fuel pump.

The fuel system may comprise a metering device. The metering device may be provided either downstream of or upstream of the main fuel pump, separate to the heater.

The vaporizer may comprise a burner configured to burn a portion of the hydrogen fuel from the fuel line.

The vaporizer may comprise a first burner exhaust heat exchanger configured to exchange exhaust heat from the burner exhaust with hydrogen fuel in the fuel line.

The heater may comprise a second heat exchanger provided downstream of the main fuel pump in fuel flow, the second heat exchanger being configured to exchange exhaust heat from the burner exhaust downstream of the first heat exchanger in exhaust flow, with gaseous hydrogen downstream of the main fuel pump in main fuel flow. Advantageously, a single heat source can be utilised to provide both vaporization of the liquid hydrogen fuel, and heating of the hydrogen fuel to the combustion temperature.

Alternatively, the vaporizer may comprise an air-to-hydrogen heat exchanger configured to exchange heat between air provided from an air-source with liquid hydrogen in the fuel line.

The air-source may comprise a gas turbine engine core compressor.

Where the vaporizer comprises a burner, the burner may be provided with air for combustion from the air-source.

An air-source heater such as an electric heater may be provided, which may be configured to raise the temperature of air-source air.

The burner may be provided downstream in air flow of the air-to-hydrogen heat exchanger.

Alternatively, the vaporizer may comprise an electric heater configured to vaporize liquid hydrogen fuel in the fuel line.

Alternatively, a first air-source may be provided for combustion air for the burner, and a second separate air-source may be provided for the vaporizer.

In a second aspect, there is provided a hydrogen-fuelled aircraft propulsion system comprising a fuel system in accordance with the first aspect.

The propulsion system may comprise a gas turbine engine or may comprise a hydrogen fuel cell.

In third aspect, there is provided a method of delivering cryogenically-stored hydrogen fuel to an aircraft propulsion system, the method comprising:
- providing hydrogen fuel in a liquid state to a vaporizer;

then, in a first heating step, vaporizing the liquid fuel in the vaporizer to provide a gaseous or supercritical fluid hydrogen fuel;

then pumping the gaseous and/or supercritical hydrogen fuel to a fuel delivery pressure;

then, in a second heating step, further heating the gaseous and/or supercritical hydrogen fuel to a propulsion system delivery temperature.

The method may further comprise bleeding compressed air from a compressor of the gas turbine engine and supplying the compressed air to a burner to burn with the portion of hydrogen fuel diverted from the main fuel line to vaporize and/or heat the fuel in the first and/or second heating step.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
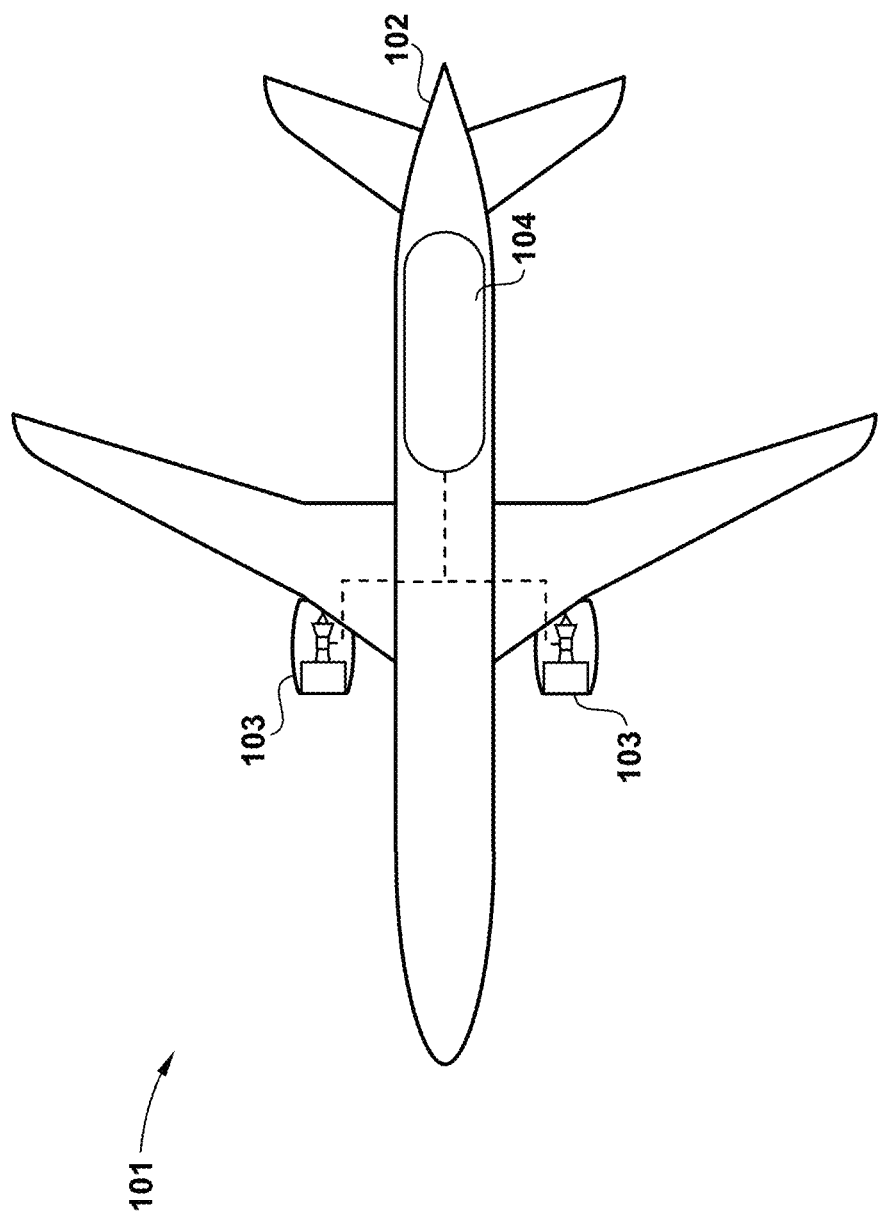
FIG. 1 shows a hydrogen-fuelled airliner comprising hydrogen-fuelled propulsion systems.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103. In the present embodiment, the turbofan engines 103 are geared turbofan engines.

A hydrogen storage tank 104 is located in the fuselage 102. In the present embodiment, the hydrogen storage tank 104 is a cryogenic hydrogen storage tank and thus stores the hydrogen fuel in a liquid state, in a specific example at 25 kelvin. In this example, the hydrogen fuel is pressurised to a pressure from around 1 bar to around 3 bar, in a specific example 2 bar.

Figure 2:
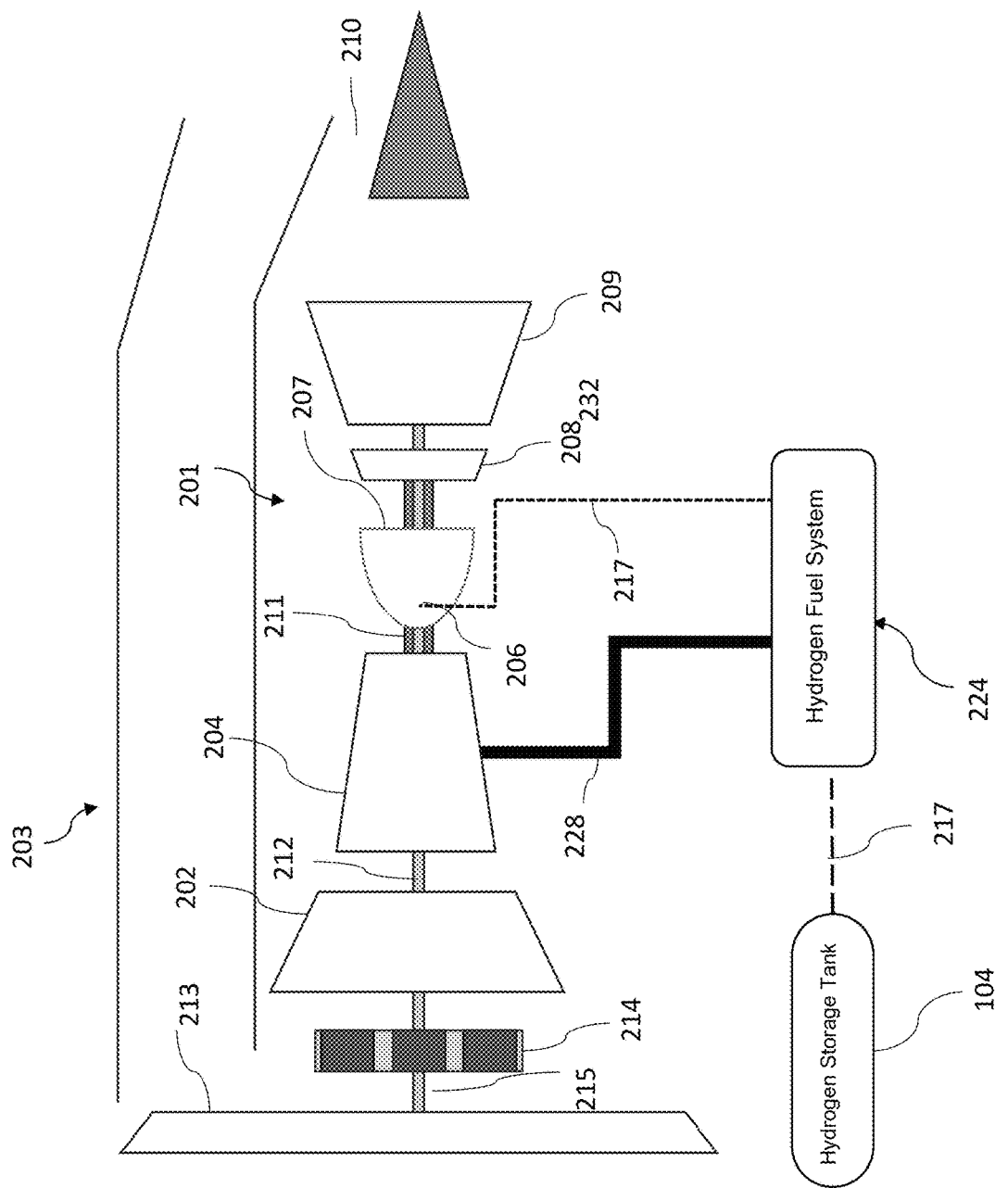
FIG. 2 shows a schematic illustration of a gas turbine engine for the aircraft of FIG. 1.

A block diagram of one of the turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

As described previously, in the present embodiment, the turbofan engines 103 are geared turbofan engines. Thus in operation the low-pressure turbine 209 drives a fan 213 via a reduction gearbox 214. The reduction gearbox receives input drive from the second shaft 212 and provides output drive to the fan 213 via a fan shaft 215. In an embodiment, the reduction gearbox 214 is an epicyclic reduction gearbox. In a specific embodiment, it is a planetary reduction gearbox. Alternatively, it may be a star reduction gearbox, or a compound epicyclic reduction gearbox. As a further alternative, the reduction gearbox 214 could be a layshaft-type reduction gearbox or any other type of reduction gearbox. It will also be appreciated that the principles disclosed herein may be applied to a direct-drive type turbofan engine, i.e. in which there is no reduction gearbox between the low-pressure turbine and the fan.

Figure 6:
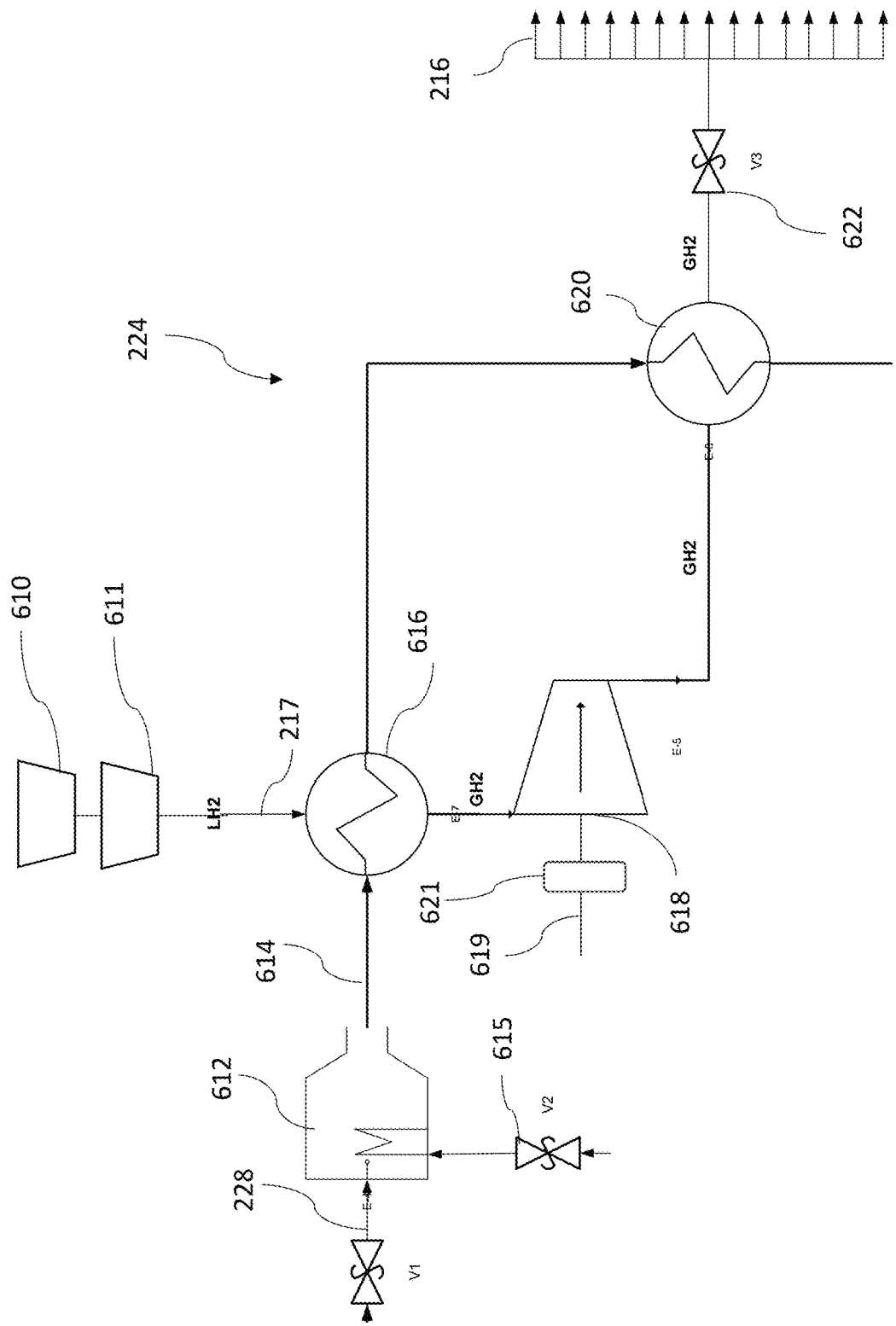
FIG. 6 is a block diagram of a first hydrogen fuel system for the airliner of FIG. 1, implementing the method of FIG. 4.

The gas turbine engine 203 is supplied with fuel from a hydrogen fuel system 224, shown in further detail in FIG. 6.

The hydrogen fuel system 224 comprises the cryogenic liquid hydrogen tank 104 and main fuel line 217. Fuel is initially pumped from the fuel tank 104 in a liquid state by a low-pressure fuel pump 610. The low-pressure fuel pump may be located within the fuel tank 104, or may be provided outside the fuel tank, in either the fuselage, wing, or engine pylon (not shown).

Optionally, a further booster pump 611 may also be provided, the booster pump 611 is provided downstream of the low-pressure pump 610, and is configured to receive relatively low-pressure liquid hydrogen fuel from the low-pressure pump, and increase the pressure to approximately 8 to 13 Bar of pressure, to convert the liquid hydrogen at the booster pump inlet to a supercritical state at the outlet.

Additional hydrogen fuel is also separately provided to a pre-heater 612. The hydrogen provided to the pre-heater 612 is typically in a gaseous form, at a temperature suitable for combustion. This may be tapped off from the main hydrogen tank 104, and may for example comprise boil-off gases from the cryogenic tank 104, or may be provided from a separate gaseous supply. Hydrogen fuel flow to the pre-heater 612 is controlled by a valve 615.

The pre-heater 612 is also supplied with high-pressure air through an air-line 616 for combustion with the hydrogen. Suitable supplies of compressed air may for example include a dedicated compressor which draws ambient air, bleed air from a bleed air line 228 from a compressor 202, 204 of the main gas turbine engine 203 (as shown in FIG. 2), or exhaust cabin air.

In operation, fuel and air are supplied to the pre-heater 612, which produces high temperature exhaust gases at an exhaust. Exhaust gases are directed through an exhaust line 614 toward a first burner exhaust heat exchanger 616.

The first burner-exhaust heat exchanger 616 is in thermal contact with liquid hydrogen in the hydrogen fuel line 217, and is configured to exchange heat with the liquid hydrogen to thereby produce a phase change within the hydrogen fuel line 217 from liquid hydrogen to gaseous or supercritical fluid hydrogen.

It will be understood that relatively little heat input is required to heat the liquid hydrogen from a liquid to a gaseous or a supercritical phase. For example, where the liquid hydrogen is stored in the cryogenic fuel tank at Kelvin (K) and 4 Bar of pressure (approximately $4 \times 10^5$ Pascals), a temperature rise of only a few Kelvin is required to raise the temperature to the boiling point. Additional energy is then required to boil the hydrogen or form a supercritical phase, liquid hydrogen having a latent heat of vaporization of 0.45 kJ/mol. Ideally, a minimal heat input to the liquid hydrogen is provided to convert the liquid hydrogen to a gas or supercritical fluid, while not raising the temperature significantly further, for reasons that will become clear below. In one example, the fuel is heated to between 25 and 30 K by the heat exchanger 616. This heating step requires a work input of around 180 kW in an arrangement modelled by the inventors.

Downstream in main hydrogen fuel flow is a gaseous/supercritical hydrogen main fuel pump 618. Suitable pumps could for example include centrifugal pumps or axial flow pumps. In some embodiments, the main fuel pump 618 could be driven by an electric motor. In the present embodiment, the pump is provided with motive power provided from the high-pressure shaft 211 via an offtake shaft 619, with power being supplemented by an electric motor 621. The main fuel pump 618 provides sufficient pressure and flow to meet the requirements of the gas turbine engine 203, and will vary in speed to provide varying flow and pressure in operation in accordance with gas turbine engine fuel demands. During this process, the temperature of the gaseous/supercritical hydrogen fuel will rise further in view of the compression of the gas, and inefficiencies in the hydrogen compression.

However, the hydrogen fuel will still be of a low temperature at the exit of the pump 618. In one example, the hydrogen will be pumped to a pressure of approximately 70 Bar, and a temperature of approximately 100K. Hydrogen typically requires a temperature of at least 150 Kelvin, in some cases a temperature greater than 200K, and typically the injection temperature is from 250 to 350 kelvin, for example 300 kelvin. In some cases, it may be desirable to heat the hydrogen to above 273 Kelvin (i.e. 0° C.) to prevent icing.

Consequently, the fuel system comprises a heater 620 configured to heat the gaseous/supercritical hydrogen to the injection temperature. In this embodiment, the heater 620 comprises a second burner-exhaust heat exchanger, which is provided downstream of the first heat exchanger 616 in burner exhaust flow, and downstream of the main fuel pump 618 in main hydrogen fuel flow. The second heat exchanger 620 is configured to transfer heat from the hydrogen burner exhaust to the hydrogen fuel, prior to injection to the gas turbine engine via the injectors 206.

Flow to the injectors 206 is controlled by a fuel metering unit (FMU) in the form of a throttle valve 622, which is provided downstream of the heater 620. Further valves 624, 615 are provided to control high pressure air and fuel delivery flows to the burner 612 respectively.

Such an arrangement provides a thermodynamically efficient method for supplying fuel to the engine, while avoiding some of the drawbacks of pumping liquid hydrogen.

Figure 5:
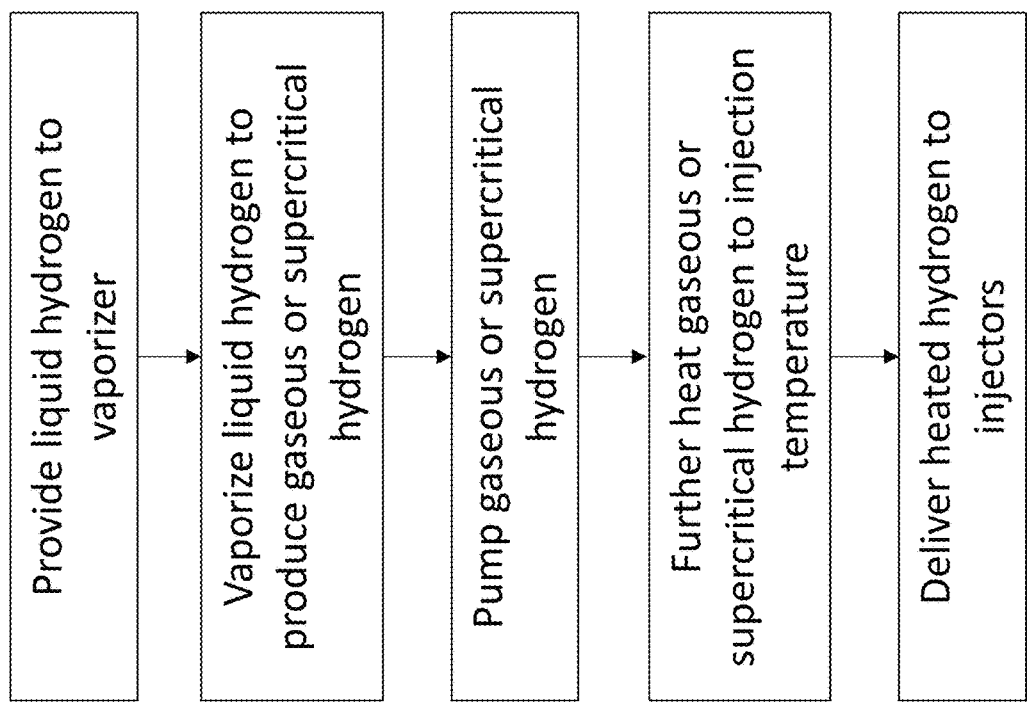
FIG. 5 is a flow diagram of a method of providing fuel to a hydrogen fuelled gas turbine engine in accordance with the present disclosure.

This method is summarized in the flow diagram shown in FIG. 5. In a first step, the liquid hydrogen is heated from a liquid to a gaseous or supercritical phase in the burner 612. The heated hydrogen is then delivered to the pump 618, where the pressure and temperature are raised further, to a required injector delivery pressure, but a temperature below the injector delivery temperature. In a third step, the high-pressure hydrogen is heated further by the heater 620, before finally being delivered to the injectors 206 via the throttle valve 622.

Figure 3:
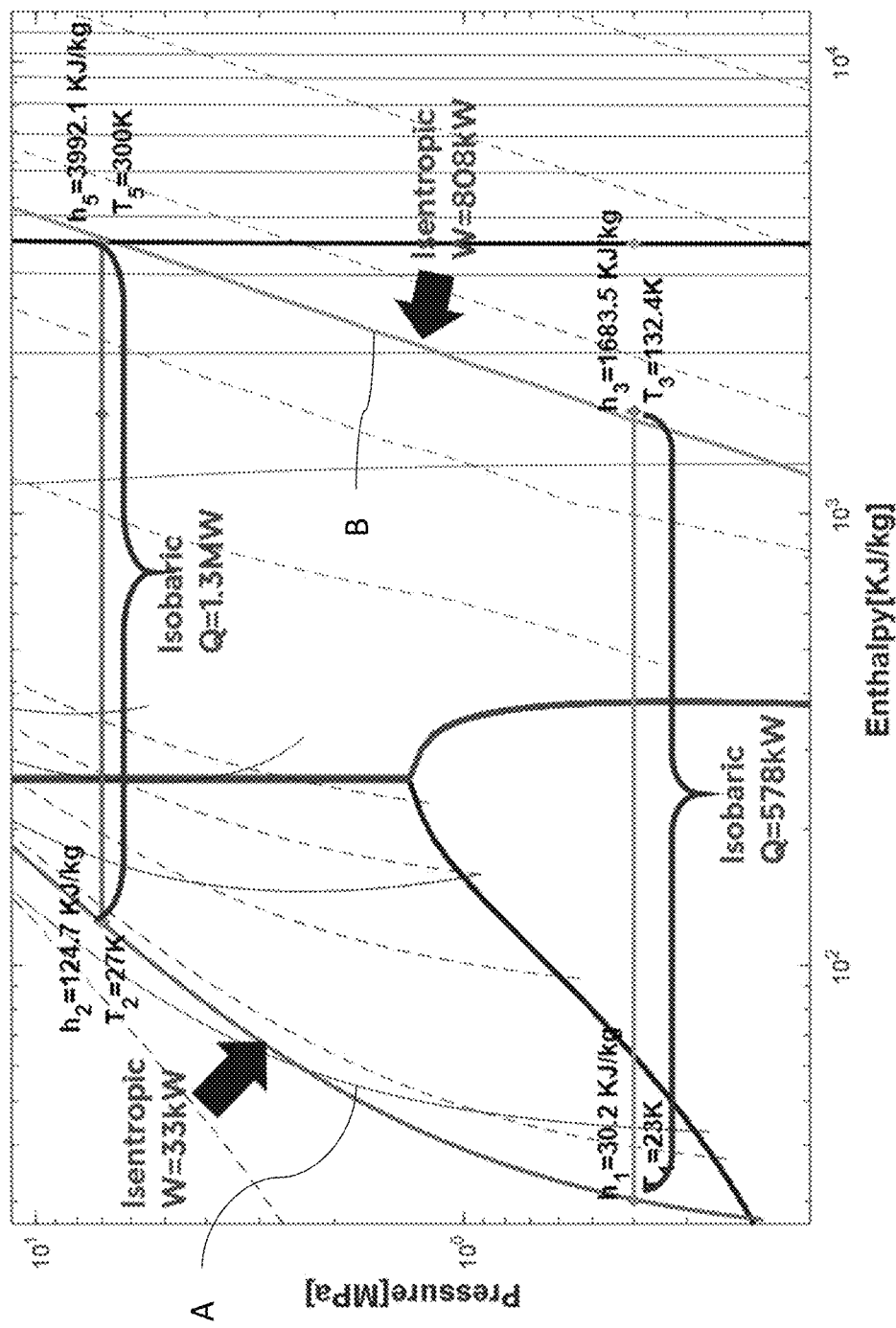
FIG. 3 is a pressure/enthalpy diagram illustrating approximate energy requirements of a prior art hydrogen fuel pumping method.

It is a well-known phenomenon that it is generally more efficient to pump fluids in their liquid state than as a gas, as illustrated in FIG. 3. FIG. 3 shows a pressure/enthalpy diagram illustrating two prior methods of heat and pumping a liquid hydrogen fuel to a required pressure and temperature.

In a first prior method not in accordance with the present embodiment, illustrated by line A, the liquid hydrogen is first pumped as a liquid from a pressure of 1 Bar ($10^5$ Pascals) to a pressure of 70 Bar at an initial temperature of 23 Kelvin (K). This is shown using ideal isentropic, 100% efficiency assumptions. As the pressure rises, the temperature also rises to 27K. The work required for this process is 33 kilowatts (kW). In practice, assuming 50% pump efficiency, the shaft work will be approximately 66 kW. Once the hydrogen is at the required pressure, the hydrogen is then heated to a required temperature of 300K. During this process, the liquid hydrogen is also converted from a liquid to a gas. The heat input of this process is 1,300 kW, giving a total energy input of 1,333 kW. Such a process is efficient, but requires pumping liquid hydrogen at cryogenic temperatures. Such pumps are challenging to construct, for example due to difficulties in lubricating bearings at such low temperatures. As such, liquid hydrogen pumps tend to have unacceptably short operational lives.

In a second method, illustrated by line B, the liquid hydrogen is first heated in a heating step from a liquid state to a gaseous state from the same initial conditions as for the first method A. The gas is then pumped in a gaseous state at the higher temperature. The gas is heated in the heating step, such that the hydrogen is at the required injection temperature subsequent to the pumping step. The energy required in the heating step in this example is 578 kW. The pumping step then requires 808 kW of pumping energy. Again, assuming 50% efficiency, this translates to 1.6 MW of shaft power for the pump. The total energy in both cases input to the hydrogen flow for raising the pressure and temperature to the required levels is the same. However, the total energy required to be input to the heating and pumping steps is in practice higher, in view of component inefficiencies.

As such, the total energy required to raise the liquid hydrogen to the required temperature and pressure for injection in the two processes is the same assuming ideal, 100% efficiencies. However, in practice, total energy requirements will be higher where the pumping is carried out on higher temperature, gaseous hydrogen, in view of pumping losses.

Figure 4:
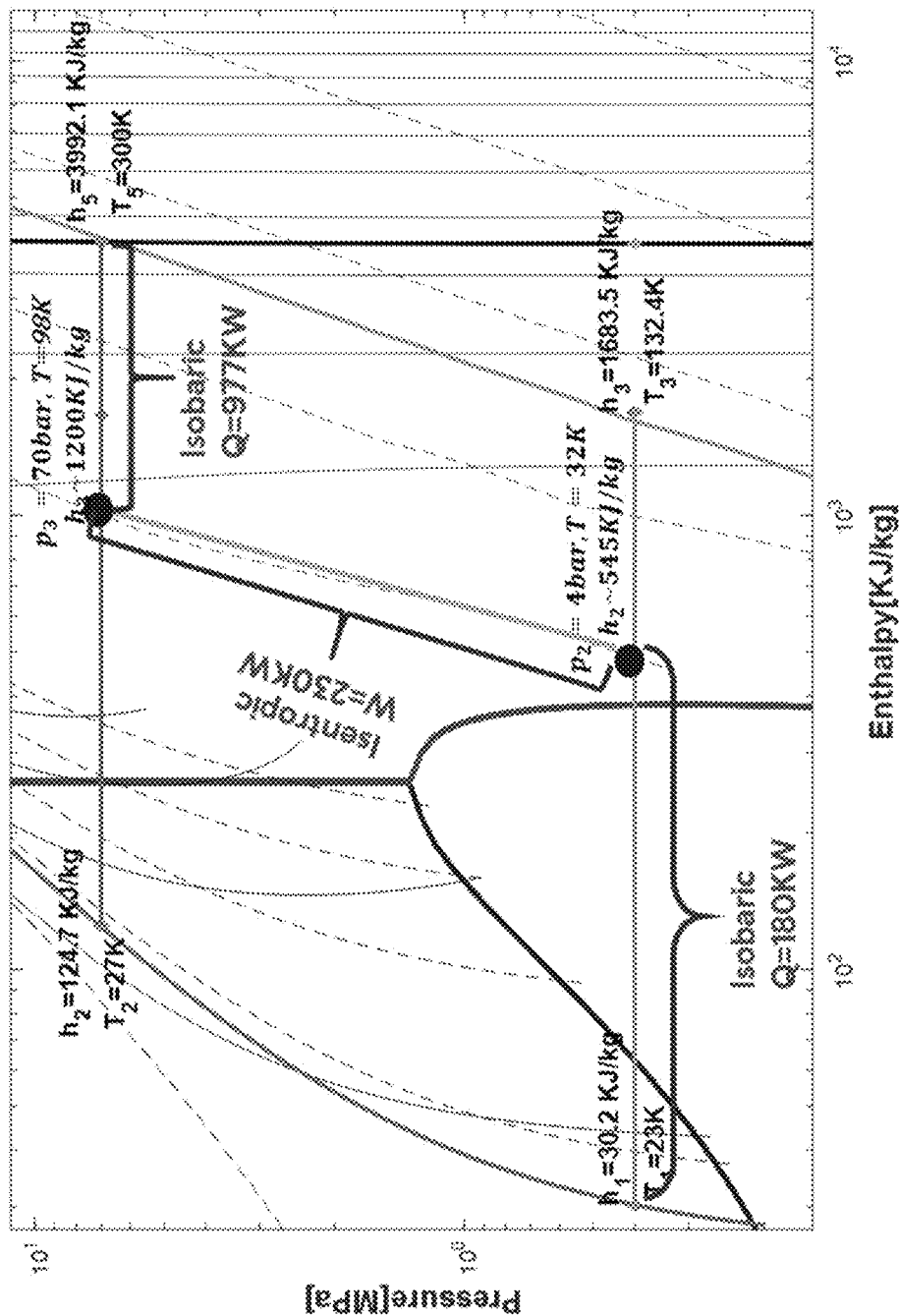
FIG. 4 is a pressure/enthalpy diagram illustrating approximate energy requirements of a hydrogen fuel pumping method in accordance with the present disclosure.

FIG. 4 illustrates the method of FIG. 5, in which the liquid hydrogen is heated, pumped and then further heated to the injector delivery temperature in accordance with the present disclosure. The initial and final conditions are the same as those in FIGS. 3 and 4.

The liquid hydrogen is first heated from a liquid to a gaseous state, raising the temperature from 23K to 32K. The heated gaseous hydrogen is then compressed to the required delivery pressure (70 Bar in this case) in a pumping step, requiring a work input of 230 kW, and producing a temperature of 98K. Assuming 50% efficiency, this translates to 460 kW of shaft power. The heated, pressurized gaseous hydrogen is then heated again in a further heating step to the require injection temperature of 300K prior to injection. This further heating step requires 977 kW of heating input.

The hydrogen is still pumped as a gas, thereby enabling the use of conventional compressor technology. However, the reduction in pumping work compared to the second method of FIG. 3 is significant –230 kW versus 808 kW for the prior gaseous pumping method shown in line B of FIG. 3. Consequently, the shaft power required for the pump is reduced by a factor of approximately 3.5 times.

This has knock-on effects for the system as a whole. Calculations by the inventors have shown that, where the pump 618 is driven by the high-pressure engine shaft 612, the shaft offtake requirement may be more than can be accommodated by the engine, and may negatively impact compressor stability where the gas is pumped in accordance with the prior method shown in line B in FIG. 3. Similarly, the large electrical power requirement where the pump is electrically driven may be greater than can be accommodated by an engine driven electrical generator. In any event, the electrical driven engine generator and/or engine offtake gearbox would have to be greatly increased in size to accommodate the large pumping requirements of the prior method. Consequently, the arrangement of the present disclosure provides both reduced fuel system energy requirements, reduced fuel pump size and weight requirements, and reduce electrical generator and/or shaft power offtake requirements.

Figure 7:
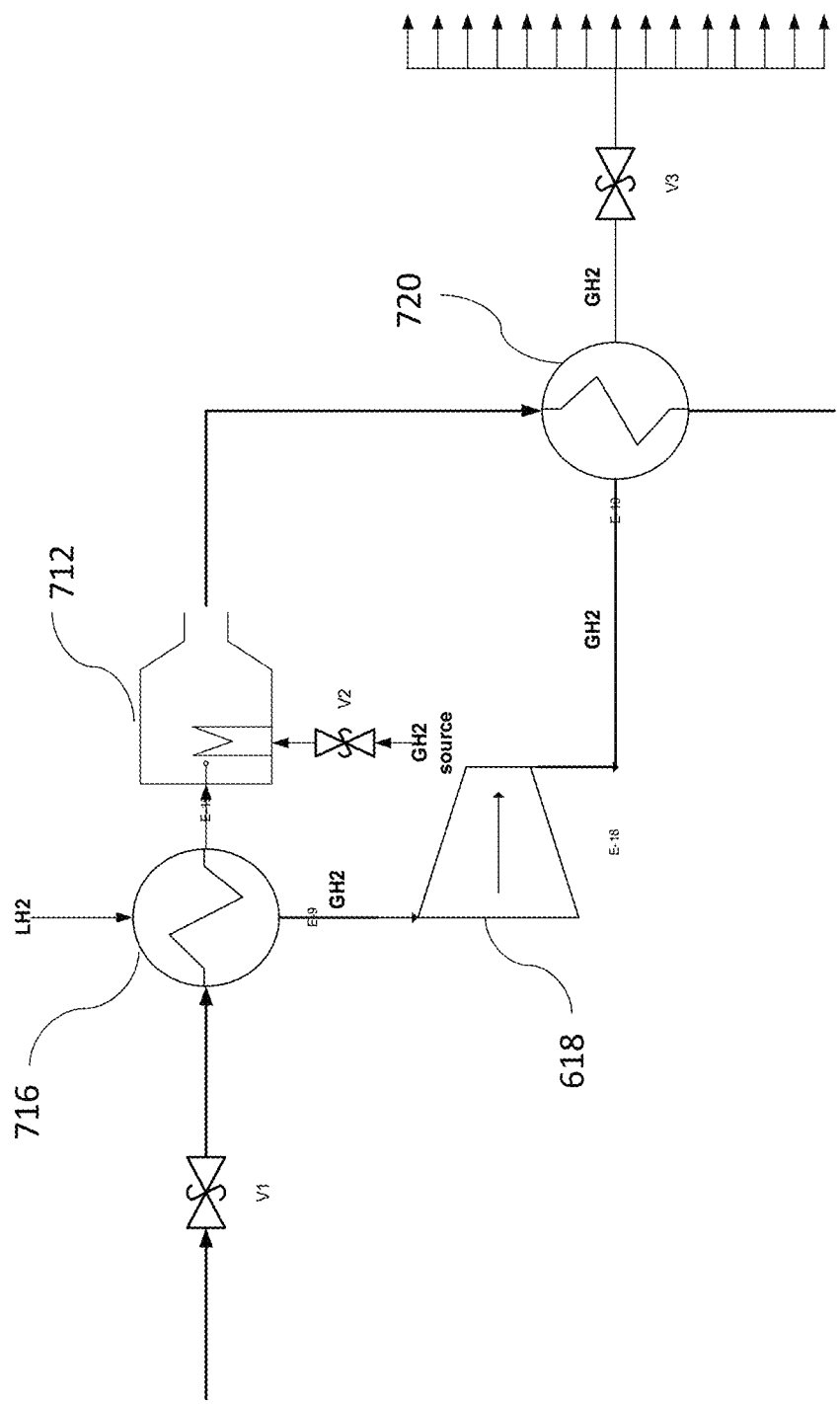
FIG. 7 is a block diagram of a second hydrogen fuel system for the airliner of FIG. 1, implementing the method of FIG. 4.

FIG. 7 illustrates a first alternative fuel system embodiment. The fuel system of FIG. 7 heats and pumps fuel in accordance with the method of FIGS. 4 and 5, but uses a different arrangement for the heat inputs.

The system of FIG. 7 comprises a first heat exchanger 716, which provides a similar function to the heat exchanger 616, and so heats the liquid hydrogen in the main fuel line 217 to produce gaseous or supercritical hydrogen. However, the heat exchanger 716 exchanges heat between high temperature bleed air from the compressor 214, rather than heater exhaust gas. Such a heat source may be sufficient for producing gaseous hydrogen, in view of the relatively low temperature increase required.

The system further comprises a burner 712, which is similar to the burner 612. The burner 712 is configured to receive gaseous hydrogen, and combine this with cooled compressor air downstream of the first heat exchanger 716 to produce high-temperature exhaust gases. A pump 718 is provided downstream of the first heat exchanger 716 in main hydrogen fuel flow, and is configured to pump the hydrogen to the required injection pressure and flow rate.

The exhaust gases from the burner 712 are provided to a second heat exchanger 720, which is similar to the second heat exchanger 620 of FIG. 6, and is again configured to exchange heat between exhaust gases from the burner 712 and high pressure hydrogen from the pump 718 to raise the temperature to the injection temperature.

Figure 8:
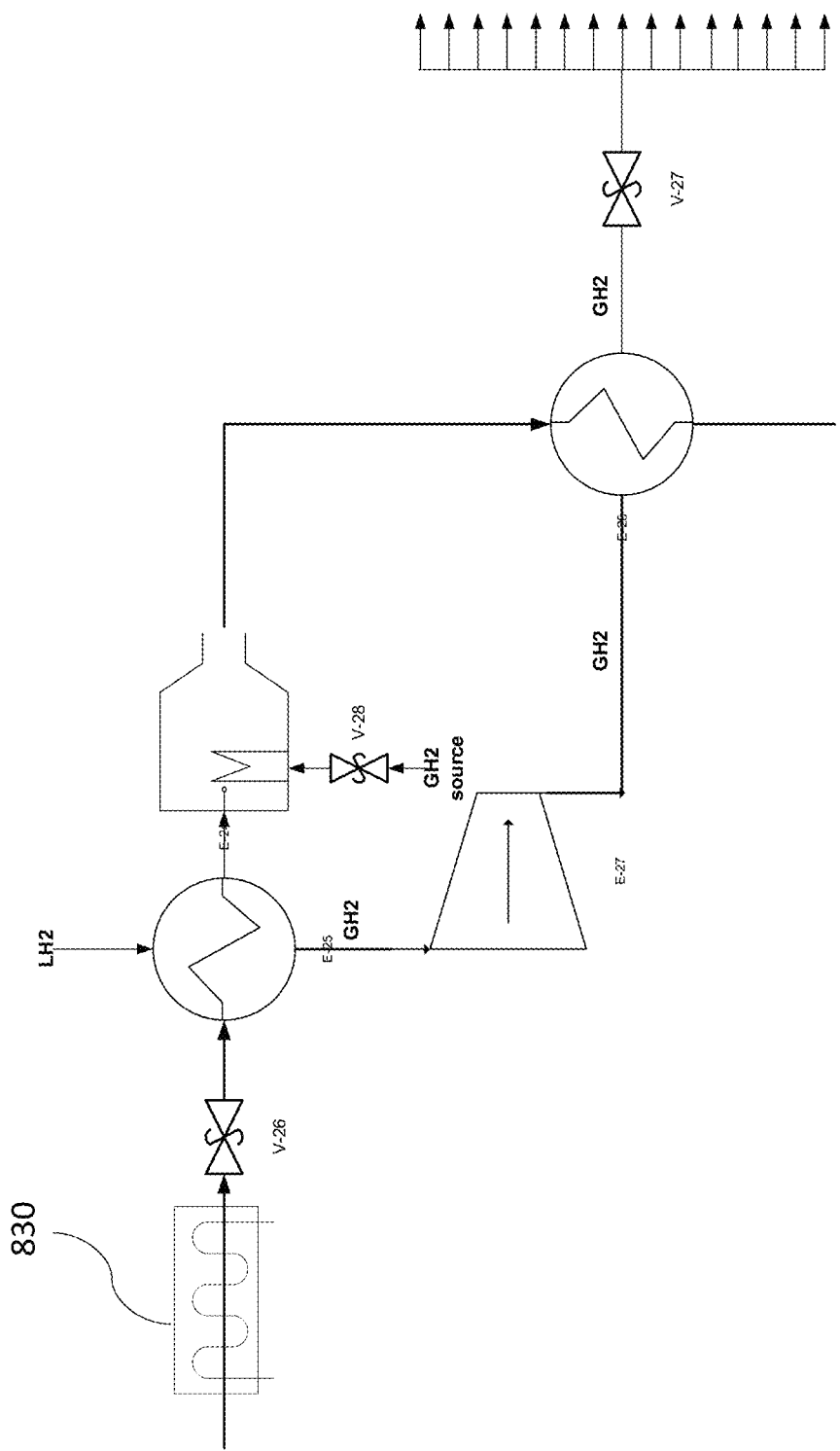
FIG. 8 is a block diagram of a third hydrogen fuel system for the airliner of FIG. 1, implementing the method of FIG. 4.

FIG. 8 illustrates a second alternative embodiment. The fuel system of FIG. 8 is similar to that of FIG. 7, but includes an additional auxiliary heater in the form of an electric heater 830. The electric heater 830 raises the temperature of air prior to delivery to the first heat exchanger 716. Such an arrangement may be useful where the air provided to the burner 612 is at a lower temperature, such as during start-up, or where the air is ambient air rather than compressor bleed air.

Figure 9:
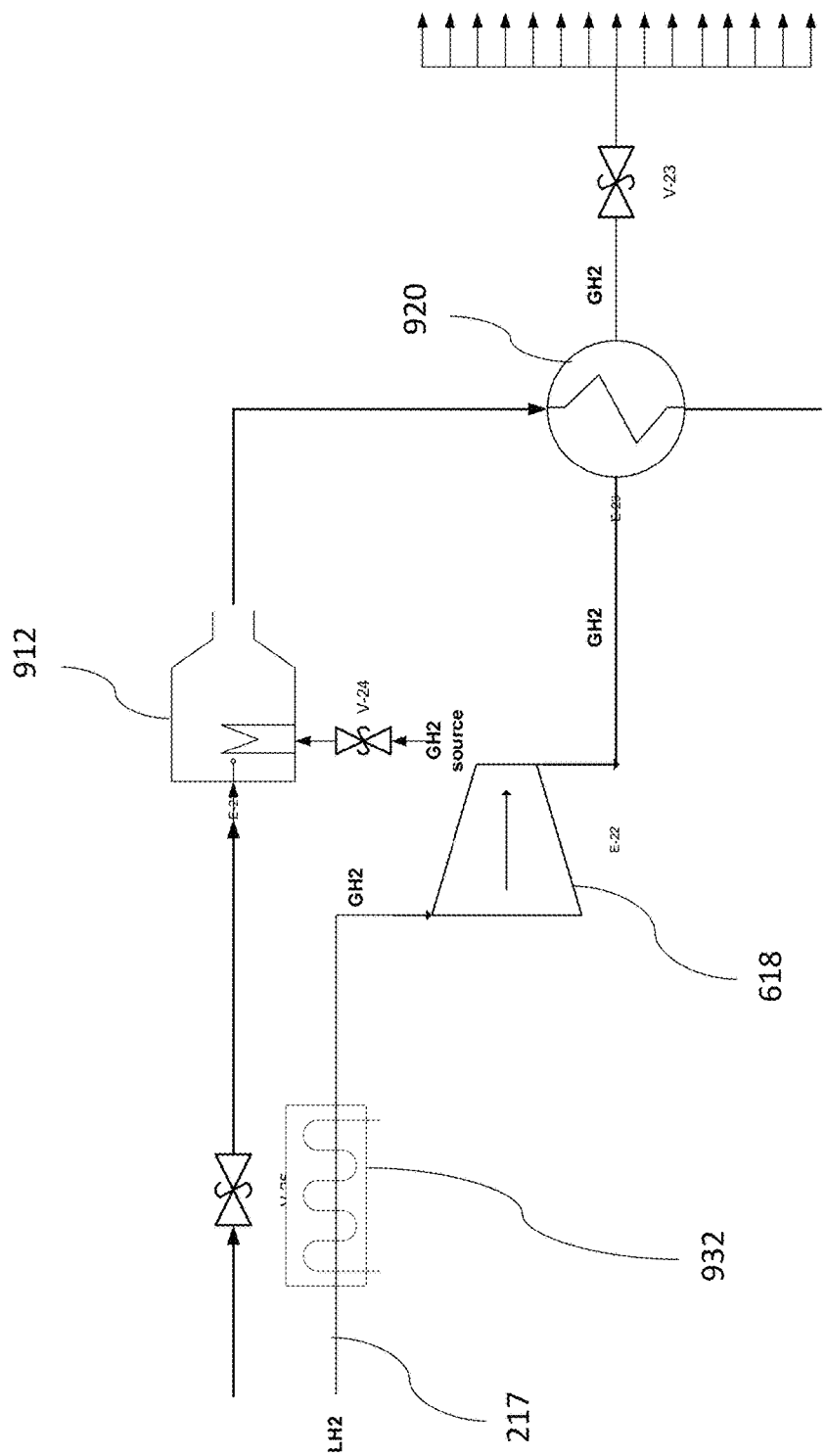
FIG. 9 is a block diagram of a fourth hydrogen fuel system for the airliner of FIG. 1, implementing the method of FIG. 4.

FIG. 9 illustrates a third alternative embodiment.

In the embodiment of FIG. 9, the first heat exchanger is replaced with an electric heater 932. The electric heater 932 is configured to directly heat liquid hydrogen in the fuel line 217 using heat generated by an electrical resistance heater such as a heater coil, to thereby convert the liquid hydrogen to either gaseous or supercritical hydrogen prior to delivery to the main fuel pump 618. Advantageously, improved control can be provided over the temperature of the hydrogen in the fuel line 217.

A burner 912 is provided, which is similar to the burner 612, and is provided with air and gaseous hydrogen for combustion, and is configured to produce high temperature exhaust gases. The high temperature exhaust gases are directed to a heat exchanger 920 downstream in exhaust gas flow of the burner 912, and is configured to heat gaseous hydrogen downstream in main fuel flow of the pump 618 to the injection temperature.

Figure 10:
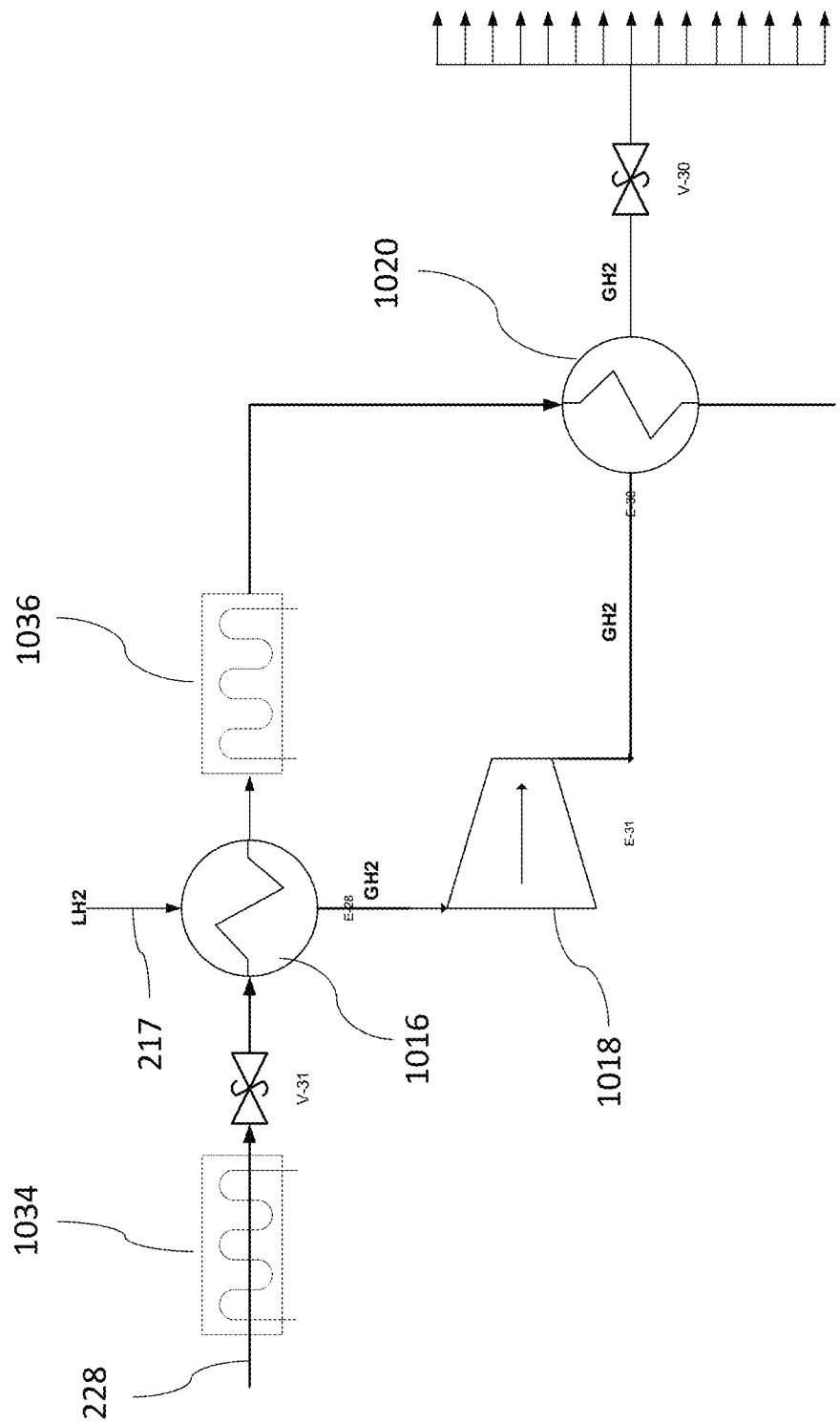
FIG. 10 is a block diagram of a fifth hydrogen fuel system for the airliner of FIG. 1, implementing the method of FIG. 4.

FIG. 10 illustrates a fourth alternative embodiment.

In the embodiment in FIG. 10, the heat input to the fuel is provided entirely from electrical heaters 1034, 1036. A first electrical heater 1034 is provided, which is configured to heat air provided in an air line, which may again comprise the bleed air line 228. A first heat exchanger 1016 is provided downstream in air flow of the first electrical heater 1034, and is configured to exchange heat between the air flow and liquid hydrogen in the hydrogen fuel line 217 to thereby convert the liquid hydrogen to gaseous or supercritical hydrogen. A main fuel pump 1018 is provided downstream of the first heat exchanger in main fuel flow.

A second electrical heater 1036 is provided downstream in air flow of the first heat exchanger 1016. This further raises the temperature of the air flow. Optionally, this second electrical heater may be omitted.

A second heat exchanger 1020 is provided, which is arranged to exchange heat between the heated air flow downstream of the second electrical heater 1036, and gaseous or supercritical hydrogen downstream in fuel flow of the pump 1018, to thereby raise the temperature to the required injection temperature. Such a system enables heating of the hydrogen during starting, where gaseous hydrogen and high pressure air for the burner or bleed air heat exchangers may not be available. As such, this may be combined with arrangements such as those shown in FIG. 6, in order to assist with start-up.

Consequently, improved temperature control and starting can be provided in view of the electrical heating.

Figure 11:
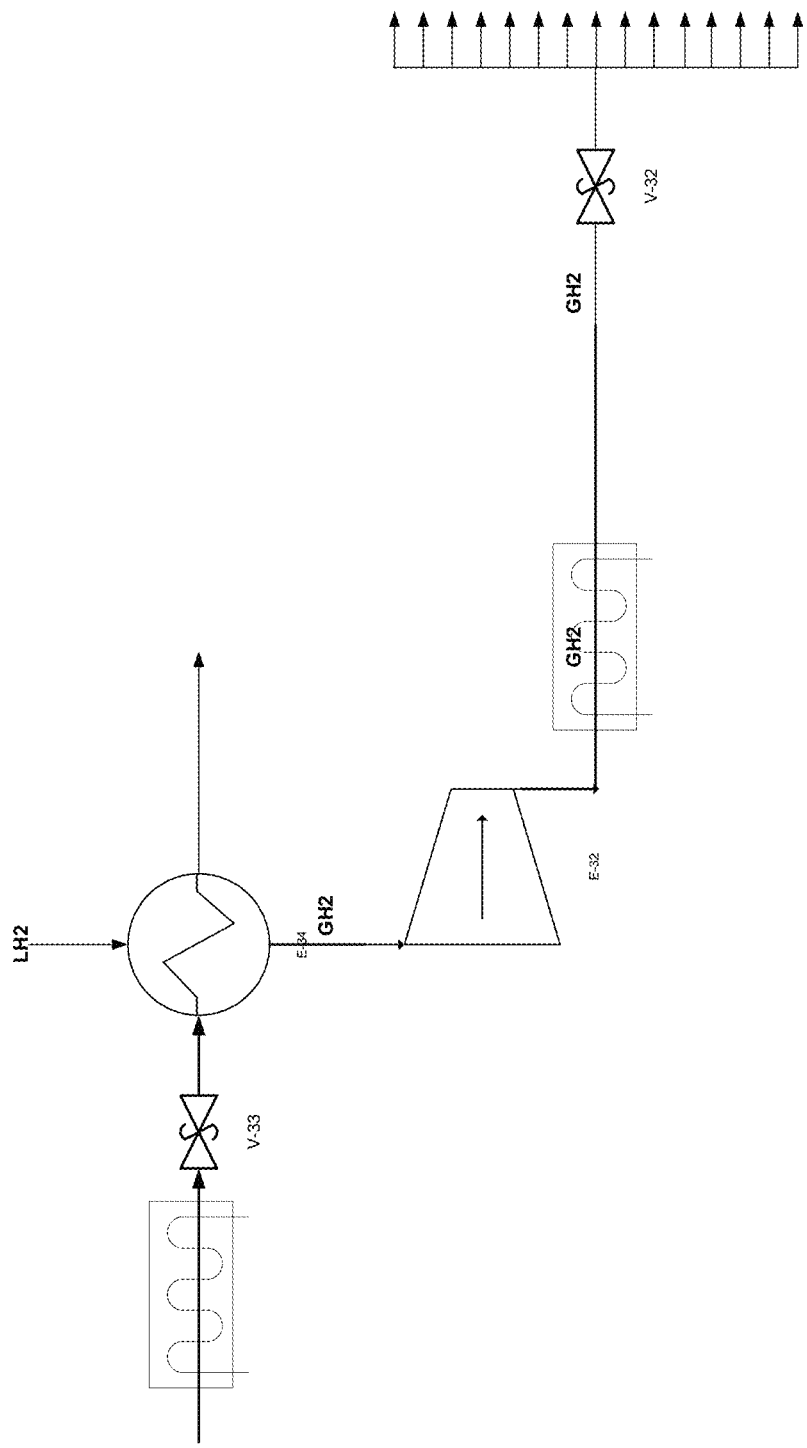
FIG. 11 is a block diagram of a sixth hydrogen fuel system for the airliner of FIG. 1, implementing the method of FIG. 4.

FIG. 11 illustrates a fifth alternative embodiment.

This embodiment is similar to that embodiment of FIG. 10. However, in place of the second electrical heater which is arranged to heat air, and second heat exchanger to heat the fuel, a second hydrogen electrical heater 1136 is provided, which is arranged to heat the hydrogen downstream of the pump 618 directly. It will be understood that in a further embodiments (not shown), the first electrical heater and heat exchanger could similarly be replaced by a direct hydrogen electrical heater.

As will be understood, the hydrogen fuel system can be configured to supply different types of hydrogen fuelled aircraft propulsion systems.

Figure 12:
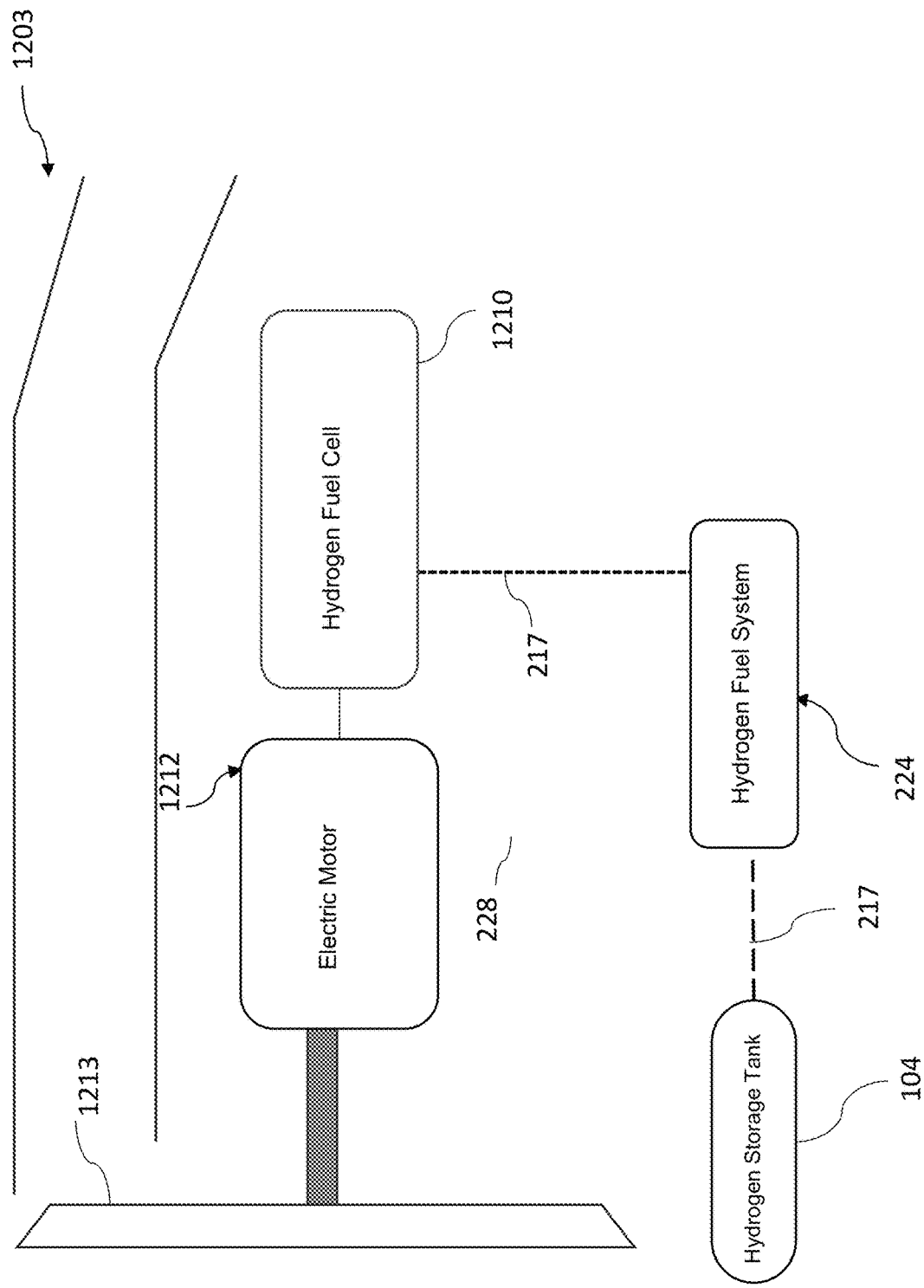
FIG. 12 is a schematic illustration of a hydrogen fuel cell propulsion system for the aircraft of FIG. 1.

FIG. 12 shows one such alternative system. A hydrogen fuel cell propulsion system 1203 comprises a propulsor in the form of a fan 1213, an electric motor 1212, and a hydrogen fuel cell 1210. The hydrogen fuel cell 1210 is of conventional construction, and is configured to produce electrical power from hydrogen fuel and oxygen from atmospheric air or some other source. In use, the hydrogen fuel cell 1210 provides electrical power to the electric motor 1212 to thereby drive the fan 1213.

A fuel system 224 is provided, which provides fuel from a liquid hydrogen fuel tank 104 at the required propulsion system delivery pressure and temperature. Any of the fuel systems shown in any of FIGS. 6 to 11 can be used for this purpose. In this case, the delivery pressure is typically lower—approximately 4 Bar, while the delivery temperature is typically similar—between 250 and 350 Kelvin, and typically approximately 300 Kelvin. In view of the lower pressure requirements, the booster pump may be omitted, and the main fuel pump may be smaller than in the embodiments in which the propulsion system comprises a gas turbine engine.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. An aircraft propulsion system fuel system comprising:
    a fuel line configured to receive liquid hydrogen fuel from a fuel tank;
    a vaporizer configured to vaporize liquid hydrogen fuel from the fuel line to generate a supercritical or gaseous fuel;
    a main fuel pump configured to receive and to pump the gaseous or supercritical fuel from the vaporizer during operation of the propulsion system;
    a heater provided downstream in fuel flow to the main fuel pump, and configured to raise the temperature of the gaseous or supercritical fuel to a propulsion system delivery temperature;
    wherein the vaporizer comprises an air-to-hydrogen heat exchanger configured to exchange heat between air provided from an air-source with liquid hydrogen in the fuel line; and
    wherein a first electric heater is provided as an air-source heater, which is configured to raise the temperature of air-source air.

2. A fuel system according to claim 1, wherein the propulsion system comprises a gas turbine engine, and the fuel system delivery temperature comprises an injector delivery temperature.

3. A fuel system according to claim 1, wherein the propulsion system comprises a hydrogen fuel cell configured to provided electrical power to drive an electrically driven propulsor, and the propulsion system delivery temperature comprises a fuel cell delivery temperature.

4. A fuel system according to claim 1, wherein the fuel system comprises a low-pressure fuel pump provided upstream of the vaporizer and the main fuel pump, and configured to pump liquid hydrogen.

5. A fuel system according to claim 4, wherein the fuel system comprises a boost pump provided between the low-pressure fuel pump and the main fuel pump.

6. A fuel system according to claim 1, wherein the fuel system comprises a metering device separate to the heater.

7. A fuel system according to claim 1, wherein the vaporizer comprises a burner configured to burn a portion of the hydrogen fuel from the fuel line.

8. A fuel system according to claim 7, wherein the vaporizer comprises a first burner exhaust heat exchanger configured to exchange exhaust heat from the burner exhaust with hydrogen fuel in the fuel line.

9. A fuel system according to claim 8, wherein the heater comprises a second heat exchanger provided downstream of the main fuel pump in fuel flow, the second heat exchanger being configured to exchange exhaust heat from the burner exhaust downstream of the first heat exchanger in exhaust flow, with gaseous hydrogen downstream of the main fuel pump in main fuel flow.

10. A fuel system according to claim 7, wherein the burner is provided downstream in air flow of the air-to-hydrogen heat exchanger.

11. A fuel system according to claim 1, wherein the air-source comprises a gas turbine engine core compressor.

12. A hydrogen-fueled aircraft propulsion system comprising a fuel system in accordance with claim 1.

13. A hydrogen-aircraft propulsion system according to claim 12, wherein the propulsion system comprises a gas turbine engine or a hydrogen fuel cell.

14. The fuel system according to claim 1, wherein a second electric heater is provided downstream of the vaporizer, which is configured to further raise the temperature of air-source air.

15. The fuel system according to claim 1, wherein the heater provided downstream in fuel flow to the main fuel pump is an electric heater.

16. A method of delivering cryogenically-stored hydrogen fuel to an aircraft propulsion system, the method comprising:
    providing hydrogen fuel in a liquid state to a vaporizer;
    then, in a first heating step, vaporizing the liquid fuel in the vaporizer to provide a gaseous or supercritical fluid hydrogen fuel;
    then pumping the gaseous and/or supercritical hydrogen fuel to a fuel delivery pressure;
    then, in a second heating step, further heating the gaseous and/or supercritical hydrogen fuel to a propulsion system delivery temperature;
    the method further including bleeding compressed air from a compressor of a gas turbine engine and supplying the compressed air to a burner to burn with the portion of hydrogen fuel diverted from the main fuel line to vaporize and/or heat the fuel in the first and/or second heating step;
    wherein the compressed air is heated by an electric heater prior to delivery to the burner.

* * * * *